United States Patent
Lunttila et al.

(10) Patent No.: US 10,812,217 B2
(45) Date of Patent: Oct. 20, 2020

(54) APERIODIC CHANNEL STATE INFORMATION (CSI) REPORTING FOR ENHANCED CARRIER AGGREGATION

(71) Applicant: Nokia Technologies Oy, Espoo (FI)

(72) Inventors: Timo Lunttila, Espoo (FI); Esa Tiirola, Kempele (FI); Klaus Hugl, Vienna (AT)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/544,245

(22) PCT Filed: Jan. 21, 2016

(86) PCT No.: PCT/FI2016/050027
§ 371 (c)(1),
(2) Date: Jul. 17, 2017

(87) PCT Pub. No.: WO2016/116669
PCT Pub. Date: Jul. 28, 2016

(65) Prior Publication Data
US 2017/0373792 A1 Dec. 28, 2017

Related U.S. Application Data

(60) Provisional application No. 62/106,990, filed on Jan. 23, 2015.

(51) Int. Cl.
*H04L 1/00* (2006.01)
*H04B 7/06* (2006.01)
*H04B 7/04* (2017.01)

(52) U.S. Cl.
CPC ............ *H04L 1/0026* (2013.01); *H04B 7/04* (2013.01); *H04B 7/0626* (2013.01);
(Continued)

(58) Field of Classification Search
CPC ..... H04L 5/005; H04L 5/0051; H04L 5/0048; H04L 5/0057; H04L 1/00; H04L 1/0003;
(Continued)

(56) References Cited

U.S. PATENT DOCUMENTS

2012/0039199 A1* 2/2012 Chen ............... H04L 1/0027
370/252
2012/0127869 A1 5/2012 Yin et al.
(Continued)

FOREIGN PATENT DOCUMENTS

| WO | WO 2012/061996 A1 | 5/2012 |
| WO | 2013/025478 A1 | 2/2013 |
| WO | 2014/116155 A1 | 7/2014 |

OTHER PUBLICATIONS

"New WI proposal: LTE Carrier Aggregation Enhancement Beyond 5 Carriers", 3GPP TSG-RAN meeting #66, RP-142286, Agenda: 14.1.1, Nokia Corporation, Dec. 8-11, 2014, 9 pages.
(Continued)

*Primary Examiner* — Habte Mered
*Assistant Examiner* — Prince A Mensah
(74) *Attorney, Agent, or Firm* — Harrington & Smith

(57) ABSTRACT

Systems, methods, apparatuses, and computer program products for aperiodic channel state information (CSI) reporting for enhanced carrier aggregation are provided. One method includes transmitting, by a network node, a configuration of at least two aperiodic channel state information (A-CSI) reporting modes per one or more configured downlink (DL) component carriers (CC) to at least one user equipment. The method may also include transmitting an aperiodic channel state information (A-CSI) trigger to the at least one user equipment. The transmitting of the A-CSI trigger may cause the at least one user equipment to dynami-
(Continued)

| Large format - "legacy Aperiodic" | | Determined DL CC | | | | | | | | | | | | | | | |
|---|---|---|---|---|---|---|---|---|---|---|---|---|---|---|---|---|---|
| Compact - "WB Aperiodic" | | Licensed Band CCs | | | | | | | | | | | | | | | |
| | PCell ↓ | | | | | | SCells | | | | | | | | | | |
| CC Index | 0 | 1 | 2 | 3 | 4 | 5 | 6 | 7 | 8 | 9 | 10 | 11 | 12 | 13 | 14 | 15 |
| A first mode: Format for the determined DL CC | Large | Large | Large | Large | Large | Large | Large | Large | Large | Large | Large | Large | Large | Large | Large | Large |
| A second Mode: Format for other DL CCs | Compact | Compact | Compact | Compact | Compact | Compact | Compact | Compact | Compact | Compact | Compact | Compact | Compact | Compact | Compact | Compact | cally switch between the two configured aperiodic channel state information (A-CSI) reporting modes.

18 Claims, 7 Drawing Sheets

(52) U.S. Cl.
CPC ......... *H04B 7/0632* (2013.01); *H04B 7/0639* (2013.01); *H04B 7/0643* (2013.01); *H04L 1/00* (2013.01); *H04L 1/0003* (2013.01); *H04L 1/0027* (2013.01)

(58) Field of Classification Search
CPC ....... H04L 1/0026; H04B 7/04; H04B 7/0626; H04B 7/0632; H04B 7/0639; H04B 7/0643
See application file for complete search history.

(56) References Cited

U.S. PATENT DOCUMENTS

| | | | | |
|---|---|---|---|---|
| 2012/0140649 | A1* | 6/2012 | Choudhury | H04W 24/10 370/252 |
| 2013/0121301 | A1* | 5/2013 | Kim | H04W 24/10 370/329 |
| 2013/0195045 | A1* | 8/2013 | Papasakellariou | H04W 72/042 370/329 |
| 2014/0086174 | A1 | 3/2014 | Nam et al. | |
| 2014/0133418 | A1* | 5/2014 | Takeda | H04L 5/0053 370/329 |
| 2015/0049706 | A1* | 2/2015 | Lee | H04L 5/0057 370/329 |
| 2015/0131568 | A1* | 5/2015 | You | H04W 88/02 370/329 |
| 2015/0207600 | A1* | 7/2015 | Park | H04L 5/005 370/329 |
| 2016/0212649 | A1* | 7/2016 | Chen | H04W 24/10 |

OTHER PUBLICATIONS

"CSI Payload Extension Using PUCCH and Periodic PUSCH", 3GPP TSG-RAN Working Group 1 meeting #57bis, R1-092558, Agenda: 15.2, Nokia Siemens Networks, Jun. 29-Jul. 3, 2009, 2 pages.
"3rd Generation Partnership Project; Technical Specification Group Radio Access Network; Evolved Universal Terrestrial Radio Access (E-UTRA); Physical layer procedures (Release 10)", 3GPP TS 36.213, V10.7.0, Sep. 2012, pp. 1-126.
"3rd Generation Partnership Project; Technical Specification Group Radio Access Network; Evolved Universal Terrestrial Radio Access (E-UTRA); Physical layer procedures (Release 12)", 3GPP TS 36.213, V123.0, Sep. 2014, pp. 1-212.
"CSI Reporting for Carrier Aggregation Enhancement Beyond 5 Carriers", 3GPP TSG-RAN Working Group 1 meeting #80, R1-15XXXX, Agenda: 7.2.2.2.3, Nokia Networks, Feb. 9-13, 2015, 4 pages.
International Search Report and Written Opinion received for corresponding Patent Cooperation Treaty Application No. PCT/FI2016/050027, dated Apr. 21, 2016, 12 pages.
R1-103694, "UCCI Transmission on PUSCH for Carrier Aggregation", Texas Instruments, 3GPP TSG RAN WG1 #61bis, Jun.-Jul. 2018, 6 pgs.
R1-105526, "Aperiodic CSI reporting for Carrier Aggregation", Nokia Siemens Networks, 3GPP TSG RAN WG1 Meeting #62bis, Oct. 2010, 2 pgs.
R1-105950, "Aperiodic CSI triggering for carrier aggregation", InterDigital Communications, LLC, 3GPP TSG-RAN WG1 Meeting #63, Nov. 2010, 4 pgs.

* cited by examiner

Fig. 2

| System BW [MHz] | 1.4 | 3 | 5 | 10 | 15 | 20 |
|---|---|---|---|---|---|---|
| Mode 1-2 (closed loop frequency selective PMI) | | | | | | |
| 2*2 antenna configuration | | | | | | |
| rank = 1 | | 6 | 12 | 18 | 22 | 24 | 30 |
| rank = 2 | | 9 | 12 | 15 | 17 | 18 | 21 |
| 4*4 antenna configuration | | | | | | |
| rank = 1 | | 8 | 20 | 32 | 40 | 44 | 56 |
| rank > 1 | | 12 | 24 | 36 | 44 | 48 | 60 |
| Mode 2-0 (open loop) | | | | | | |
| tx diversity & max 2 or 4 layer spatial mux (Large Delay CDD) | 4 | 9 | 14 | 19 | 21 | 24 |
| Mode 2-2 (closed loop dual-PMI) | | | | | | |
| 2*2 antenna configuration | | | | | | |
| rank = 1 | 8 | 13 | 18 | 23 | 25 | 28 |
| rank =2 | 10 | 17 | 22 | 27 | 29 | 32 |
| 4*4 antenaa configuration | | | | | | |
| rank = 1 | 12 | 17 | 22 | 27 | 29 | 32 |
| rank > 1 | 16 | 23 | 28 | 29 | 35 | 38 |
| Mode 3-0 (open loop) | | | | | | |
| tx diversity & max 2 or 4 layer spatial mux (Large Delay CDD) | 4 | 12 | 18 | 22 | 24 | 30 |
| Mode 3-1 (closed loop wideband PMI) | | | | | | |
| 2*2 antenna configuration | | | | | | |
| rank =1 | 6 | 14 | 20 | 24 | 26 | 32 |
| rank = 2 | 9 | 25 | 37 | 45 | 49 | 61 |
| 4*4 antenna configuration | | | | | | |
| rank = 1 | 8 | 16 | 22 | 26 | 28 | 34 |
| rank > 1 | 12 | 28 | 40 | 48 | 52 | 64 |
| Mode 3-2 (closed loop frequency selective PMI) | | | | | | |
| 2*2 antenna config | | | | | | |
| rank = 1 | 6 | 20 | 32 | 40 | 44 | 56 |
| rank = 2 | 10 | 32 | 50 | 62 | 68 | 86 |
| 4*4 antenna config | | | | | | |
| rank = 1 | 8 | 28 | 46 | 58 | 64 | 82 |
| rank > 1 | 12 | 40 | 64 | 80 | 88 | 112 |
| System BW [MHz] | 1.4 | 3 | 5 | 10 | 15 | 20 |

Fig. 4

| Large format - "legacy Aperiodic" | | | | | | | | | | | | | | | | |
|---|---|---|---|---|---|---|---|---|---|---|---|---|---|---|---|---|
| Compact - "WB Aperiodic" | | | | | | | | | | | | | | | | |

Determined DL CC → (index 0)

| | Licensed Band CCs | | | | SCells | | | | | | | | | | | |
|---|---|---|---|---|---|---|---|---|---|---|---|---|---|---|---|---|
| | PCell | | | | | | | | | | | | | | | |
| CC Index | 0 | 1 | 2 | 3 | 4 | 5 | 6 | 7 | 8 | 9 | 10 | 11 | 12 | 13 | 14 | 15 |
| A first mode: Format for the determined DL CC | Large | Large | Large | Large | Large | Large | Large | Large | Large | Large | Large | Large | Large | Large | Large | Large |
| A second Mode: Format for other DL CCs | Compact | Compact | Compact | Compact | Compact | Compact | Compact | Compact | Compact | Compact | Compact | Compact | Compact | Compact | Compact | Compact |

Fig. 5

| Large format - "legacy Aperiodic" | | | | | | | | | | | | | | | | |
|---|---|---|---|---|---|---|---|---|---|---|---|---|---|---|---|---|
| Compact - "WB Aperiodic" | | | | | | | | | | | | | | | | |

Determined DL CC → (index 8)

| | Licensed Band CCs | | | | SCells | | | | | | | | | | | |
|---|---|---|---|---|---|---|---|---|---|---|---|---|---|---|---|---|
| | PCell | | | | | | | | | | | | | | | |
| CC Index | 0 | 1 | 2 | 3 | 4 | 5 | 6 | 7 | 8 | 9 | 10 | 11 | 12 | 13 | 14 | 15 |
| A first mode: Format for the determined DL CC | Large | Large | Large | Large | Compact | Compact | Compact | Compact | Large | Compact | Compact | Compact | Compact | Compact | Compact | Compact |
| A second Mode: Format for other DL CCs | Large | Large | Large | Large | Compact | Compact | Compact | Compact | Compact | Compact | Compact | Compact | Compact | Compact | Compact | Compact |

Fig. 6

| Large format - "legacy Aperiodic" | | | | | | | | | | | | | | | | |
|---|---|---|---|---|---|---|---|---|---|---|---|---|---|---|---|---|
| Compact - "WB Aperiodic" | | | | | | | | | | | | | | | | |

Determined DL CC → (index 8)

| | Licensed Band CCs | | | | SCells | | | | | | | | | | | |
|---|---|---|---|---|---|---|---|---|---|---|---|---|---|---|---|---|
| | PCell | | | | | | | | | | | | | | | |
| CC Index | 0 | 1 | 2 | 3 | 4 | 5 | 6 | 7 | 8 | 9 | 10 | 11 | 12 | 13 | 14 | 15 |
| A first mode: Format for the determined DL CC | Large | Large | Large | Large | Large | Large | Large | Large | Large | Compact | Compact | Compact | Compact | Compact | Compact | Compact |
| A second Mode: Format for other DL CCs | Large | Large | Large | Large | Compact | Compact | Compact | Compact | Compact | Compact | Compact | Compact | Compact | Compact | Compact | Compact |

APERIODIC CHANNEL STATE INFORMATION (CSI) REPORTING FOR ENHANCED CARRIER AGGREGATION

RELATED APPLICATION

This application was originally filed as PCT Application No. PCT/FI2016/050027, filed on Jan. 21, 2016, which claims priority from U.S. Application No. 62/106,990, filed on Jan. 23, 2015.

BACKGROUND

Field

Embodiments of the invention generally relate to wireless communications networks, such as, but not limited to, the Universal Mobile Telecommunications System (UMTS) Terrestrial Radio Access Network (UTRAN), Long Term Evolution (LTE) Evolved UTRAN (E-UTRAN), LTE-Advanced (LTE-A), future 5G radio access technology, and/or High Speed Packet Access (HSPA).

Description of the Related Art

Universal Mobile Telecommunications System (UMTS) Terrestrial Radio Access Network (UTRAN) refers to a communications network including base stations, or Node Bs, and for example radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS). In case of E-UTRAN (enhanced UTRAN), no RNC exists and most of the RNC functionalities are contained in the enhanced Node B (eNodeB or eNB).

Long Term Evolution (LTE) or E-UTRAN refers to improvements of the UMTS through improved efficiency and services, lower costs, and use of new spectrum opportunities. In particular, LTE is a 3GPP standard that provides for uplink peak rates of at least, for example, 75 megabits per second (Mbps) per carrier and downlink peak rates of at least, for example, 300 Mbps per carrier. LTE supports scalable carrier bandwidths from 20 MHz down to 1.4 MHz and supports both Frequency Division Duplexing (FDD) and Time Division Duplexing (TDD).

As mentioned above, LTE may also improve spectral efficiency in networks, allowing carriers to provide more data and voice services over a given bandwidth. Therefore, LTE is designed to fulfill the needs for high-speed data and media transport in addition to high-capacity voice support. Advantages of LTE include, for example, high throughput, low latency, FDD and TDD support in the same platform, an improved end-user experience, and a simple architecture resulting in low operating costs.

Certain releases of 3GPP LTE (e.g., LTE Rel-10, LTE Rel-11, LTE Rel-12, LTE Rel-13) are targeted towards international mobile telecommunications advanced (IMT-A) systems, referred to herein for convenience simply as LTE-Advanced (LTE-A).

LTE-A is directed toward extending and optimizing the 3GPP LTE radio access technologies. A goal of LTE-A is to provide significantly enhanced services by means of higher data rates and lower latency with reduced cost. LTE-A is a more optimized radio system fulfilling the international telecommunication union-radio (ITU-R) requirements for IMT-Advanced while keeping the backward compatibility.

One the key features of LTE-A, introduced in LTE Rel-10, is carrier aggregation, which allows for increasing the data rates through aggregation of two or more LTE carriers.

SUMMARY

One embodiment is directed to a method that may include transmitting, by a network node, a configuration of two A-CSI reporting modes per one or more configured DL CC via, for example, RRC signaling to one or more UEs. The method may also include transmitting an A-CSI trigger to one or more UEs. According to certain embodiments, the transmitting of the A-CSI trigger may cause the UE(s) to dynamically switch between the two configured A-CSI reporting modes. The method may also include receiving an A-CSI report from the UE(s) based on the triggered/requested A-CSI.

Another embodiment is directed to an apparatus, which may include at least one processor and at least one memory including computer program code. The at least one memory and computer program code may be configured, with the at least one processor, to cause the apparatus at least to transmit configuration of two A-CSI reporting modes per one or more configured DL CC via, for example, RRC signaling to one or more UEs. The at least one memory and computer program code may be further configured, with the at least one processor, to cause the apparatus to transmit an A-CSI trigger to one or more UEs. According to certain embodiments, the transmitting of the A-CSI trigger may cause the UE(s) to dynamically switch between the two configured A-CSI reporting modes. The apparatus may also be caused to receive an A-CSI report from the UE(s) according to the triggered/requested A-CSI.

Another embodiment is directed to an apparatus that may include configuring means for configuring two A-CSI reporting modes per one or more configured DL CC via, for example, RRC signaling to one or more UEs. The apparatus may also include transmitting means for transmitting an A-CSI trigger to one or more UEs. According to certain embodiments, the transmitting of the A-CSI trigger may cause the UE(s) to dynamically switch between the two configured A-CSI reporting modes. The apparatus may also include receiving means for receiving an A-CSI report from the UE(s) according to the triggered/requested A-CSI.

Another embodiment is directed to a computer program embodied on a computer readable medium. The computer program may be configured to control a processor to perform a process comprising configuring two A-CSI reporting modes per one or more configured DL CC via, for example, RRC signaling to one or more UEs. The process may also include transmitting an A-CSI trigger to one or more UEs. According to certain embodiments, the transmitting of the A-CSI trigger may cause the UE(s) to dynamically switch between the two configured A-CSI reporting modes. The process may further include receiving an A-CSI report from the UE(s) according to the triggered/requested A-CSI.

Another embodiment is directed to a method that may include receiving, by a UE, configuration of two A-CSI reporting modes per one or more configured DL CC, and receiving an A-CSI trigger (e.g., A-CSI request field) from a network node (e.g., eNB). The A-CSI trigger may indicate how the two configured A-CSI reporting modes are to be applied. The method may further include dynamically switching between the two configured A-CSI reporting modes based on the indication in the A-CSI trigger (e.g., a value of the CSI request field) to produce an appropriate A-CSI report. The method may also include transmitting the A-CSI report to the network node.

Another embodiment is directed to an apparatus, which may include at least one processor and at least one memory including computer program code. The at least one memory and computer program code may be configured, with the at least one processor, to cause the apparatus at least to receive a configuration of two A-CSI reporting modes per configured downlink component carrier, and to receive an A-CSI trigger from a network node (e.g., eNB). The A-CSI trigger (e.g., a CSI request field) which may indicate how the two configured A-CSI reporting modes should be applied. The at least one memory and computer program code may be further configured, with the at least one processor, to cause the apparatus at least to dynamically switch between the two configured A-CSI reporting modes based on the indication in the A-CSI trigger (e.g., a value of the CSI request field) to produce an appropriate A-CSI report, and to transmit the A-CSI report to the network node.

Another embodiment is directed to an apparatus that may include receiving means for receiving a configuration of two A-CSI reporting modes per component carrier, and for receiving an A-CSI trigger from a network node (e.g., eNB). The A-CSI trigger (e.g., CSI request field) may include an indication of how the two configured A-CSI reporting modes should be applied. The apparatus may further include switching means for dynamically switching between the two configured A-CSI reporting modes based on the indication in the A-CSI trigger (e.g., a value of the CSI request field) to produce an appropriate A-CSI report. The apparatus may also include transmitting means for transmitting the A-CSI report to the network node.

Another embodiment is directed to a computer program embodied on a computer readable medium. The computer program may be configured to control a processor to perform a process comprising receiving, by a UE, configuration of two A-CSI reporting modes per component carrier, and receiving an A-CSI trigger (e.g., A-CSI request field) from a network node (e.g., eNB). The A-CSI trigger may indicate how the two configured A-CSI reporting modes are to be applied. The process may further include dynamically switching between the two configured A-CSI reporting modes based on the indication in the A-CSI trigger (e.g., a value of the CSI request field) to produce an appropriate A-CSI report. The process may also include transmitting the A-CSI report to the network node.

BRIEF DESCRIPTION OF THE DRAWINGS

For proper understanding of the invention, reference should be made to the accompanying drawings, wherein:

FIG. 2 illustrates Aperiodic CSI reporting modes supported in 3GPP Release-12 and their respective payload sizes;

FIG. 4 illustrates an example block diagram in which, for each CC, a "Large" and a "Compact" CSI reporting mode have been configured as the First mode and the Second mode, respectively;

FIG. 5 illustrates an example block diagram in which the "Large" CSI reporting modes have been configured as the First mode and the Second mode;

FIG. 6 illustrates an example block diagram in which, for all CCs, "Large" CSI reporting formats have been configured as the First mode;

DETAILED DESCRIPTION

Figure 1:
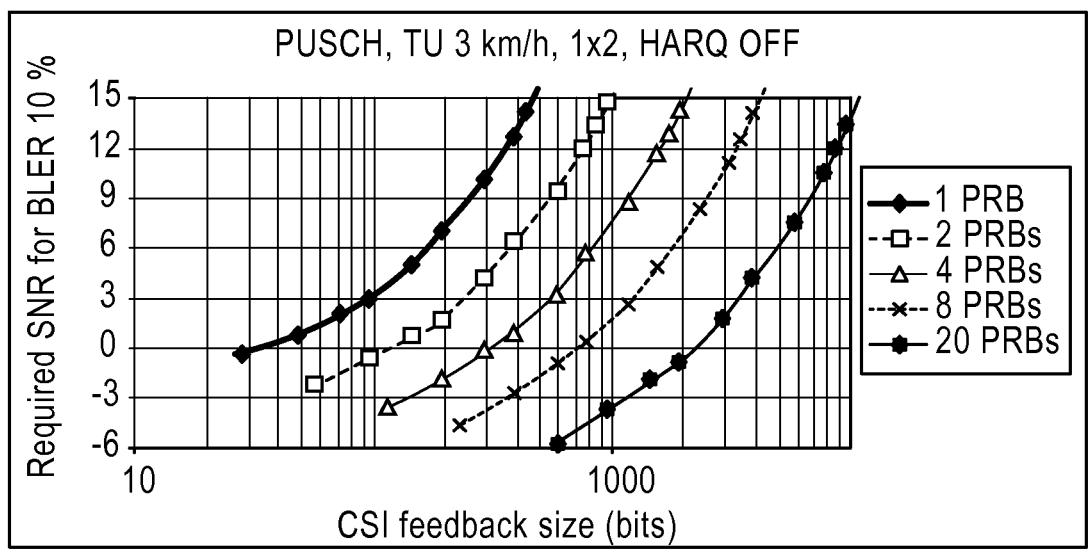
FIG. 1 illustrates a graph showing examples of the performance of CSI feedback with varying payload sizes and bandwidths.

It will be readily understood that the components of the invention, as generally described and illustrated in the figures herein, may be arranged and designed in a wide variety of different configurations. Thus, the following detailed description of embodiments of systems, methods, apparatuses, and computer program products for aperiodic channel state information (CSI) reporting for enhanced carrier aggregation, as represented in the attached figures, is not intended to limit the scope of the invention, but is merely representative of some selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

Embodiments of the invention relate to LTE carrier aggregation enhancements, for example beyond 5 component carriers (e.g., up to 32 carriers) including the support for physical uplink control channel (PUCCH) on secondary cell (SCell), which are to be standardized as part of 3GPP LTE Release-13. More specifically, an embodiment relates to aperiodic CSI reporting on physical uplink shared channel (PUSCH).

The carrier aggregation framework supporting carrier aggregation (CA) of up to 5 component carriers in uplink (UL) and/or downlink (DL) of the same frame structure (FDD-FDD or TDD-TDD) has been introduced in LTE- Advanced (i.e., 3GPP LTE Release-10), where it is assumed that the cells/carriers do have a fast (close to ideal) backhaul connection.

In 3GPP Release-11, the CA framework has been extended by supporting inter-band TDD carrier aggregation with different UL-DL configurations and, moreover, enabled different timing advance values for carriers belonging to different timing advance groups (TAGs) improving the UL carrier aggregation support. In 3GPP Release-12, TDD-FDD carrier aggregation has been introduced and enables the support of carrier aggregation of carrier with different frame structures, i.e., it is possible for a single user to aggregate resources of FDD & TDD carriers.

Also, dual-connectivity support has been introduced in 3GPP Release-12 which enables the aggregation of resources of cells which do not have ideal (fast) backhaul connectivity between the different cells or cell groups. One of the cell groups may be supported by a master eNB (MeNB) and the other cell group by a secondary eNB (SeNB). Here, additional support for dual-PUCCH operation was specified, where separate UL control channels (PUCCHs) are provided for the MeNB and SeNB. Within the MeNB and SeNB cell groups, normal carrier aggregation operation is possible as such.

Licensed-Assisted Access (LAA), which is also known as LTE-U, has created a great amount of interest in extending the LTE carrier aggregation feature towards capturing the spectrum opportunities of unlicensed spectrum in the 5 GHz band. Wireless local area network (WLAN) operating in the 5 GHz band currently already supports 80 MHz in the field and 160 MHz is to follow in Wave 2 deployment of IEEE 802.11ac. There are also other frequency bands, such as 3.5 GHz, where aggregation of more than one carrier on the same band is possible, in addition to the bands already widely in use for LTE.

Enabling the utilization of at least similar bandwidths for LTE in combination with LAA, as IEEE 802.11ac Wave 2 will support, calls for extending the carrier aggregation framework to support more than 5 (at least DL) carriers. The extension of the CA framework beyond 5 carriers would give operators an opportunity to more efficiently utilize the available spectrum for communication needs.

3GPP is to work on enhancements to carrier aggregation including Uplink Control Information (UCI) signalling supporting up to 32 component carriers. In particular, necessary mechanisms will be specified to enable the LTE carrier aggregation of up to 32 component carriers for the DL and UL, including: enhancements to DL control signalling for up to 32 component carriers including both self-scheduling and cross-carrier scheduling, if any [RAN1]; enhancements to UL control signalling for up to 32 component carriers [RAN1]—enhancements to support UCI feedback on PUCCH for up to 32 DL carriers, for example specifying the necessary enhancements to UCI signalling formats to support UCI feedback for up to 32 DL carriers, and enhancements to support UCI feedback on PUSCH for up to 32 DL carriers; and higher layer enhancements for a UE to aggregate up to 32 component carriers, if identified [RAN2].

As the number of aggregated carriers increases, several L1 design aspects need to be reconsidered, especially related to UCI transmission. One such aspect is CSI reporting, where larger number of supported carriers becomes a challenge. Thus, embodiments of the invention provide mechanisms for providing Aperiodic CSI (A-CSI) feedback for an increased number of carriers.

Although 3GPP Release-10 CA (and its evolution in Release-11 and 12) supports up to 5 component carriers in UL and/or DL, it has been primarily optimized for two component carriers (CC). For example, it was seen as sufficient to not allow for multiplexing of periodic CSI reports on PUCCH for multiple CCs in one subframe. Instead, in case of a collision the agreement is to drop all reports but one according to a predefined priority order. It is clear that increasing requirements for CSI reporting due to larger number of utilized carriers makes this kind of operation highly inefficient. This example gives a hint that "optimization point" for Release-13 CA operation supporting up-to 32 carriers should be much higher than just two CCs.

Not all the CA aspects scale directly with an increasing number of component carriers. As an example, if the number of aggregated DL CCs is increased, more CSI feedback will need to be provided to be able to schedule the increasing number of different CCs efficiently. On the other hand, an increased number of carriers does not improve UL link budget, and as a consequence it cannot be assumed that a UE would be able to support CSI feedback for, e.g., 32 carriers by simply extending the existing CA framework.

It is assumed that the number of carriers will increase mainly in the DL direction, and not in the UL side, which is also given by the fact that either a DL CC or a DL and the respective UL & DL CC can be configured (not possible to configure only an UL CC of a respective carrier according to the Release-10 CA framework). Furthermore, in the most likely deployment scenario, namely LTE LAA, most of the UL control information (such as CSI) may be conveyed via licensed carrier (Primary cell (Pcell)). This will create considerable signalling load in the Pcell. Hence, there is great interest in optimizing the CSI reporting (both periodic and aperiodic) to be as efficient as possible.

On one hand, the eNB should have as much accurate CSI available as possible when making the scheduling decisions. However, due to practical limitations related to UL link budget (i.e., coverage) and capacity, the payload size of CSI provided over PUSCH cannot be realistically increased from the level of 3GPP Release-10 carrier aggregation supporting 5 CCs, i.e., the practically feasible payloads are in the order of a few hundreds of bits at maximum. This is illustrated in FIG. 1, which depicts a graph showing the performance of CSI feedback with varying payload sizes and bandwidths in terms of required Signal-to-Interference-plus-Noise Ratio (SINR) to achieve a 10% Block Error Rate (BLER).

An Aperiodic CSI feedback framework for carrier aggregation has been standardized in 3GPP Release-10, which is capable of supporting up to 5 CCs. However, as discussed above, with a vastly increased number of supported carriers the limitations of the current framework become apparent and enhancements are needed.

Aperiodic CSI reporting may support a number of feedback modes (formats), characterizing the key aspects of propagation channel as seen by the UE, including one or more of: Channel Quality Indicator (CQI), Precoding Matrix Indicator (PMI), and Rank Indicator (RI). Furthermore, the feedback modes indicate frequency selective information by indicating separate CQI and/or PMI values for different groups of contiguous physical resource blocks (PRBs). The Aperiodic CSI reporting modes supported in 3GPP Release-12 and their respective payload sizes (excluding CRC) are summarized in FIG. 2. As can be seen from FIG. 2, the payload of an Aperiodic CSI report for a single 20 MHz component carrier can be as large as 112 bits.

Under the principles of Aperiodic CSI reporting in Carrier aggregation, as described in 3GPP TS 36.213 v. 10.7.0, section 7.2.1: A UE may perform aperiodic CSI reporting using the PUSCH in subframe n+k on serving cell c, upon decoding in subframe n either an uplink DCI format or a Random Access Response Grant, for serving cell c if the respective CSI request field is set to trigger a report and is not reserved. If the CSI request field is 1 bit, then a report is triggered for serving cell c if the CSI request field is set to '1'. If the CSI request field size is 2 bits, then a report is triggered according to the value in TABLE 1 (which corresponds to Table 7.2.1-1A of 3GPP TS 36.213 v. 10.7.0) corresponding to aperiodic CSI reporting. A UE is not expected to receive more than one aperiodic CSI report request for a given subframe.

TABLE 1

| Value of CSI request field | Description |
| --- | --- |
| '00' | No aperiodic CSI report is triggered |
| '01' | Aperiodic CSI report is triggered for serving cell c |
| '10' | Aperiodic CSI report is triggered for a $1^{st}$ set of serving cells configured by higher layers |
| '11' | Aperiodic CSI report is triggered for a $2^{nd}$ set of serving cells configured by higher layers |

As can be seen from TABLE 1, Aperiodic CSI in carrier aggregation is triggered with 2 bits in the UL grant. Two of the codepoints in the A-CSI request field ('10' and '11') trigger A-CSI for a set of explicitly (via higher-layer (RRC) signalling) configured CCs. Another codepoint ('01') triggers A-CSI report for the serving cell c, which is the UL cell which shall carry the CSI report. This type of reporting (case '01') is denoted as implicit indication of the reported carrier.

Regarding the modes of the Aperiodic CSI reporting, 3GPP Release-12 version of 3GPP TS 36.213 supports the modes depicted in TABLE 2 (corresponding to Table 7.2.1-1 of TS 36.213). In particular, TABLE 2 depicts CQI and PMI feedback types for Aperiodic CSI reporting modes. The respective CSI report sizes are given in FIG. 2 discussed above.

TABLE 2

| | | PMI Feedback Type | |
| --- | --- | --- | --- |
| | No PMI | Single PMI | Multiple PMI |
| PUSCH CQI Feedback Type | Wideband (wideband CQI) | | | Mode 1-2 |
| | UE Selected (subband CQI) | Mode 2-0 | | Mode 2-2 |
| | Higher Layer-configured (subband CQI) | Mode 3-0 | Mode 3-1 | Mode 3-2 |

Considering the increased number of supported carriers (i.e., up-to 32 CCs), the current A-CSI triggering mechanism proves to be clearly insufficient. Explicit radio resource control (RRC) configuration of reported carriers (as in LTE Rel-10) is impractical when the number of CCs is higher than 5 (i.e., up to 32 according to the current WI). This is due to the reason that in practice, the payload of Aperiodic CSI reports cannot be more than a few hundred bits, or otherwise the coverage and/or the CSI overhead of the reports is severely compromised (as can be seen in FIG. 1). Therefore, one A-CSI report cannot include the detailed, frequency selective CSI for more than a few carriers. Implicit indication of the reported carrier (codepoint '01' of the CSI request field) is also suboptimal, since it provides feedback for one CC only, which is clearly insufficient when the number of DL carriers is increased up to 32.

Therefore, there is a need for enhancing the flexibility of Aperiodic CSI reporting and especially the triggering mechanisms to ensure the eNB has means to obtain CSI necessary for Carrier Aggregation with up to 32 DL CCs. The solution should be flexible enough to support desired trade-off between CSI accuracy (impacting DL throughput) and CSI feedback burden (impacting UL capacity/coverage) in various deployment scenarios (such as LTE LAA) having different number of DL/UL component carriers configured (and/or activated).

As outlined above, with the number of aggregated DL CCs is increased (up to 32 CCs), more CSI feedback will need to be provided to be able to schedule the increasing number of different CCs efficiently. Embodiments of the invention aim to support the desired trade-off between CSI accuracy and CSI feedback burden in various deployment scenarios, such as LTE LAA, having different number of DL/UL component carriers configured/activated. For example, certain embodiments enhance the triggering of A-CSI to allow for more flexible indication of the reported carrier(s) and to provide means to adjust dynamically the A-CSI reporting mode to be used for a given CC in a given subframe.

One embodiment includes configuring A-CSI reporting for different cells or CCs in a flexible way (instead of a fixed configuration of a single mode per CC), with either of the reporting modes also having possible different sizes (i.e., large and compact) in order to be able to report up to 32 cells. According to an embodiment, at least two A-CSI reporting modes may be configured per each configured DL component carrier via RRC signalling (this may relate to either (1) each configured DL CCs in general or (2) each configured DL CCs part of the Second Aperiodic CSI-reporting mode). The two A-CSI reporting modes may be denoted herein as the "first Aperiodic CSI-reporting mode" and the "second Aperiodic CSI-reporting mode". The two A-CSI reporting modes can be configured independently for each downlink CC, that is, the two A-CSI modes for one DL CC do not need to be the same as the two A-CSI modes for another DL CC.

Further, according to certain embodiments, a mechanism for dynamically switching between the two Aperiodic CSI-reporting modes is provided. In one embodiment, the first Aperiodic CSI-reporting mode, which may have the 'Large' format for the determined DL carrier, may be applied when the A-CSI trigger is implicitly associated with that DL Component carrier. In some embodiments, implicit association can be determined based, for example, on: 1) the serving cell which carries (via PDCCH or EPDCCH) the UL grant or the DL assignment including the A-CSI trigger, or 2) the serving cell which shall carry the PUSCH including the A-CSI report. In an embodiment, the second Aperiodic CSI-reporting mode, which may have the 'Compact' format for other DL carriers, may be applied when the A-CSI trigger refers to some other DL Component carrier. Also, as mentioned above, the two A-CSI modes can be dynamically switched between each other.

According to another embodiment, a specific codepoint in the CSI request field may trigger the feedback of the first Aperiodic CSI-reporting mode for the cells configured by higher layers. According to yet another embodiment, a specific codepoint in the CSI request field may trigger the feedback of the second Aperiodic CSI-reporting mode for the cells configured by higher layers. According to yet another embodiment, a specific codepoint in the CSI request field may trigger the feedback of the first Aperiodic CSI-reporting mode for the cells configured by higher layers and the feedback of the second Aperiodic CSI-reporting mode for the other cells. According to yet another embodiment, a specific codepoint in the CSI request field may trigger the feedback of the first Aperiodic CSI-reporting mode for the cells configured by higher layers and the feedback of the second Aperiodic CSI-reporting mode for another set of cells configured by higher layers.

A further aspect of the invention is directed to a definition of one or more new Aperiodic CSI-reporting modes. These are denoted as compact, i.e., wideband Aperiodic CSI reporting modes (as opposed to the existing, large and frequency selective Aperiodic CSI reporting modes 1-2, 2-0, 2-2, 3-0, 3-1, and 3-2), and the contents of these modes may be similar to those of periodic wideband CSI reporting modes 1-0 and 1-1, i.e., they may contain wideband information of CQI, RI and possibly PMI (legacy periodic and aperiodic CSI reporting modes are described in 3GPP TS 36.213, v.12.3.0).

In an embodiment, the wideband Aperiodic CSI reporting mode is configured as the Second Aperiodic CSI-reporting mode.

According to certain embodiments, the size of the compact CSI mode can be, for example, that of mode 1-0 or mode 1-1 of periodic CSI reporting with a payload size in the range of 4 to 11 bits per CC excluding the rank indicator. This is clearly a significant reduction compared to the existing Aperiodic CSI reporting formats summarized in FIG. 2 (where at least 21 bits are required for 20 MHz BW). As a result, embodiments scale better up to 32 CCs (or any number of CCs beyond 5).

Figure 3A:
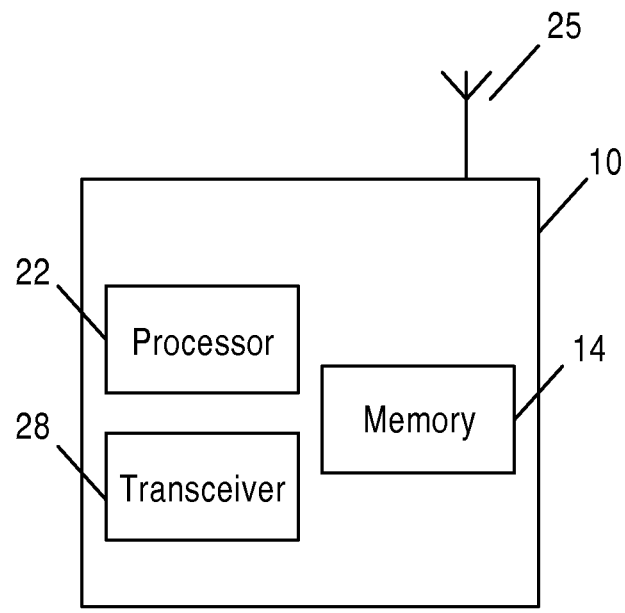
FIG. 3a illustrates an example of an apparatus, according to an embodiment.

FIG. 3a illustrates an example of an apparatus 10 according to an embodiment. In an embodiment, apparatus 10 may be a node, host, or server in a communications network or serving such a network. For example, apparatus 10 may be a network node or access node for a radio access network, such as a base station, node B or eNB, or an access node of 5G radio access technology. It should be noted that one of ordinary skill in the art would understand that apparatus 10 may include components or features not shown in FIG. 3a.

As illustrated in FIG. 3a, apparatus 10 includes a processor 22 for processing information and executing instructions or operations. Processor 22 may be any type of general or specific purpose processor. While a single processor 22 is shown in FIG. 3a, multiple processors may be utilized according to other embodiments. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 may further include or be coupled to a memory 14 (internal or external), which may be coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, or any other type of non-transitory machine or computer readable media. The instructions stored in memory 14 may include program instructions or computer program code that, when executed by processor 22, enable the apparatus 10 to perform tasks as described herein.

In some embodiments, apparatus 10 may also include or be coupled to one or more antennas 25 for transmitting and receiving signals and/or data to and from apparatus 10. Apparatus 10 may further include or be coupled to a transceiver 28 configured to transmit and receive information. For instance, transceiver 28 may be configured to modulate information on to a carrier waveform for transmission by the antenna(s) 25 and demodulate information received via the antenna(s) 25 for further processing by other elements of apparatus 10. In other embodiments, transceiver 28 may be capable of transmitting and receiving signals or data directly.

Processor 22 may perform functions associated with the operation of apparatus 10 which may include, for example, precoding of antenna gain/phase parameters, encoding and decoding of individual bits forming a communication message, formatting of information, and overall control of the apparatus 10, including processes related to management of communication resources.

In an embodiment, memory 14 may store software modules that provide functionality when executed by processor 22. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

In one embodiment, as mentioned above, apparatus 10 may be a network node or access node, such as a base station, node B, or eNB, or an access node of 5G, for example. According to one embodiment, apparatus 10 may be controlled by memory 14 and processor 22 to configure and transmit configuration of two A-CSI reporting modes per one or more configured DL CC via, for example, RRC signaling (in certain embodiments, it may be possible to have two aperiodic CSI reporting modes only for certain cells). In an embodiment, apparatus 10 may then be controlled by memory 14 and processor 22 to transmit an A-CSI trigger to one or more UEs. The A-CSI trigger may include an indication of how the two A-CSI reporting modes should be applied. According to certain embodiments, the transmitted A-CSI trigger may cause the UE(s) to dynamically switch between the two A-CSI reporting modes.

For example, in one embodiment, the A-CSI trigger may cause the UE(s) to apply a first of the two A-CSI reporting modes when the A-CSI trigger is associated implicitly with that DL component carrier. According to one embodiment, the first A-CSI reporting mode may have a large format. In certain embodiments, implicit association can be determined based on, for example, two options. Under option 1, implicit association may be determined based on the serving cell which carries (e.g., via PDCCH or EPDCCH) the UL grant or the DL assignment including the A-CSI trigger. Under option 2, implicit association may be determined based on the serving cell which shall carry the PUSCH including the A-CSI report.

According to an embodiment, the A-CSI trigger may cause the UE(s) to apply a second of the two A-CSI reporting modes when the A-CSI trigger refers to some other DL component carrier. In one embodiment, the second A-CSI reporting mode may have a compact format.

In one embodiment, apparatus 10 may also be controlled by memory 14 and processor 22 to receive the A-CSI report from the UE according to the triggered/requested A-CSI.

Figure 3B:
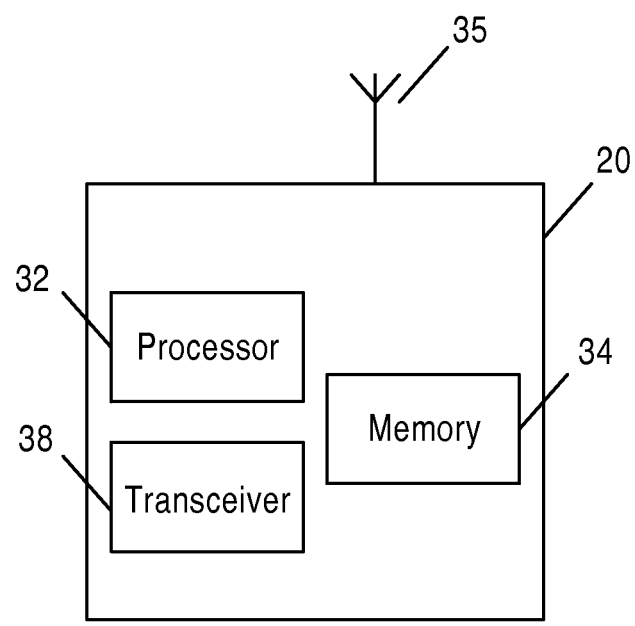
FIG. 3b illustrates an example of an apparatus, according to an embodiment.

FIG. 3b illustrates an example of an apparatus 20 according to another embodiment. In an embodiment, apparatus 20 may be a node or element in a communications network or associated with such a network, such as a UE, mobile device, mobile unit, or other device. For instance, in some embodiments, apparatus 20 may be UE in LTE, LTE-A, or 5G. It should be noted that one of ordinary skill in the art would understand that apparatus 20 may include components or features not shown in FIG. 3b.

As illustrated in FIG. 3b, apparatus 20 includes a processor 32 for processing information and executing instructions or operations. Processor 32 may be any type of general or specific purpose processor. While a single processor 32 is shown in FIG. 3b, multiple processors may be utilized according to other embodiments. In fact, processor 32 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 20 may further include or be coupled to a memory 34 (internal or external), which may be coupled to processor 32, for storing information and instructions that may be executed by processor 32. Memory 34 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 34 can be comprised of any combination of random access memory (RAM), read only memory (ROM), static storage such as a magnetic or optical disk, or any other type of non-transitory machine or computer readable media. The instructions stored in memory 34 may include program instructions or computer program code that, when executed by processor 32, enable the apparatus 20 to perform tasks as described herein.

In some embodiments, apparatus 20 may also include or be coupled to one or more antennas 35 for transmitting and receiving signals and/or data to and from apparatus 20. Apparatus 20 may further include a transceiver 38 configured to transmit and receive information. For instance, transceiver 38 may be configured to modulate information on to a carrier waveform for transmission by the antenna(s) 35 and demodulate information received via the antenna(s) 35 for further processing by other elements of apparatus 20. In other embodiments, transceiver 38 may be capable of transmitting and receiving signals or data directly.

Processor 32 may perform functions associated with the operation of apparatus 20 including, without limitation, precoding of antenna gain/phase parameters, encoding and decoding of individual bits forming a communication message, formatting of information, and overall control of the apparatus 20, including processes related to management of communication resources.

In an embodiment, memory 34 stores software modules that provide functionality when executed by processor 32. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

As mentioned above, according to one embodiment, apparatus 20 may be a mobile device, such as a UE. In this embodiment, apparatus 20 may be controlled by memory 34 and processor 32 to receive, from a network node (e.g., eNB), a configuration of two A-CSI modes per component carrier, and to receive an A-CSI trigger from the network node. In an embodiment, the A-CSI trigger may include an indication of how the two A-CSI reporting modes should be applied. In an embodiment, the A-CSI trigger may be a CSI request field to indicate how the configured two A-CSI reporting modes should be applied. In response to the A-CSI trigger, apparatus 20 may be further controlled by memory 34 and processor 32 to transmit the A-CSI report as requested to the network node. FIGS. 4-6, which will be discussed in detail below, present some examples on how the CSI feedback reporting according to certain embodiments may be operated. For the sake of simplicity, 16 component carriers (CCs) are illustrated in the examples of FIGS. 4-6; however, embodiments of the invention may scale into any number of CCs.

In the following examples, the Aperiodic CSI reporting modes are categorized in two groups: Large, or Compact. Large mode may include, for example, legacy frequency selective Aperiodic CSI reporting modes 1-2, 2-0, 2-2, 3-0, 3-1, and 3-2. Compact mode may include new, wideband CSI reporting modes similar to periodic CSI reporting modes 1-0 and 1-1. For example, in one embodiment, the size of the compact CSI mode may be that of mode 1-0 or mode 1-1 of periodic CSI reporting with a payload size in the range of 4 to 11 bits per CC, excluding rank indicator.

FIG. 4 illustrates an example where, for each CC, a "Large" and a "Compact" CSI reporting mode have been configured as the First mode and the Second mode, respectively. In the example of FIG. 4, upon receiving an A-CSI trigger associated with an SCell DL CC #3, the UE may feedback to the eNB an A-CSI of "Large mode" for DL CC #3, and an A-CSI of Compact for all other configured DL CCs.

FIG. 5 illustrates an example where, for the CC on e.g., licensed bands (in this example, CC #0 to CC #3) the "Large" CSI reporting modes have been configured as the First mode and the Second mode. For the CCs on e.g. unlicensed bands (in this example, CC #4 to CC #15), however, "Compact" CSI reporting modes have been configured as the First mode and the Second mode. In the example of FIG. 5, upon receiving an A-CSI trigger associated with DL CC #9 (which is an unlicensed carrier in this example), the UE may feedback to the eNB an A-CSI of "Large mode" for DL CC #0, #1, #2, and #3 (i.e., the licensed band carriers in this example), and an A-CSI of Compact mode for all other DL CCs (i.e., the unlicensed band carriers in this example). It should be noted that the division between licensed CCs and unlicensed CCs is just an example. In some embodiments, it is also possible that all CCs are, for example, on the licensed band. Additionally, it should be noted that the division with respect to CSI configuration may also be done based on the cell type, such as macro cell vs. small cell.

FIG. 6 illustrates an example where, for all CCs, "Large" CSI reporting formats have been configured as the First mode. For the licensed bands (i.e., CC #0 to CC #3), "Large" CSI reporting formats have also been configured as the Second mode, while for unlicensed band carriers (i.e., CC #4 to CC #15) the Second mode is a "Compact" mode. In the example of FIG. 6, upon receiving an A-CSI trigger associated with SCell #9 (unlicensed band carrier), the UE may feedback to the eNB an A-CSI of "Large mode" for DL CC #0, #1, #2, #3 (i.e., the licensed band carriers) and #9 (the triggering CC), and A-CSI of "Compact" mode for all other DL CCs (according to the configuration).

TABLE 3 illustrates examples of the CSI request field and the corresponding results based on the value of the CSI request field, according to embodiments of the invention. At least portions of the anticipated RAN1 specification change (3GPP TS 36.213) related to the definition of Aperiodic CSI triggering is underlined in TABLE 3.

TABLE 3

| Value of CSI request field | Description |
| --- | --- |
| '00' | No aperiodic CSI report is triggered |
| '01' | Aperiodic CSI report <u>of a first mode</u> is triggered for serving cell c <br> <u>Aperiodic CSI report of a second mode is triggered for serving cells configured by higher layers excluding serving cell c</u> |
| '10' | Aperiodic CSI report is triggered for a $1^{st}$ set of serving cells configured by higher layers |
| '11' | Aperiodic CSI report is triggered for a $2^{nd}$ set of serving cells configured by higher layers |

Alternatively, the number of bits in the A-CSI trigger can be increased by one, for example, to enhance the flexibility of CSI reporting. The example in TABLE 4 depicts embodiments with a CSI request field value of '111', '001', '010', '011', '110', '100', and '101'.

TABLE 4

| Value of CSI request field | Description |
| --- | --- |
| '000' | No aperiodic CSI report is triggered |
| '001' | Aperiodic CSI report <u>of a first mode</u> is triggered for serving cell c |
| '010' | Aperiodic CSI report <u>of a first mode</u> is triggered for a $1^{st}$ set of serving cells configured by higher layers |
| '011' | Aperiodic CSI report <u>of a first mode</u> is triggered for a $2^{nd}$ set of serving cells configured by higher layers |
| '100' | Aperiodic CSI report of a second mode is <u>triggered for a $3^{rd}$ set of serving cells configured by higher layers</u> |
| '101' | Aperiodic CSI report <u>of a first mode</u> is <u>triggered for a $4^{th}$ set of serving cells configured by higher layers</u> <br> Aperiodic CSI report of a second mode is <u>triggered for serving cells not included in the $4^{th}$ set</u> |
| '110' | Aperiodic CSI report of a first mode is <u>triggered for a $5^{th}$ set of serving cells configured by higher layers</u> |
| '111' | Aperiodic CSI report of a first mode is triggered for serving cell c <br> <u>Aperiodic CSI report of a second mode is triggered for serving cells configured by higher layers excluding serving cell c</u> |

Figure 7:
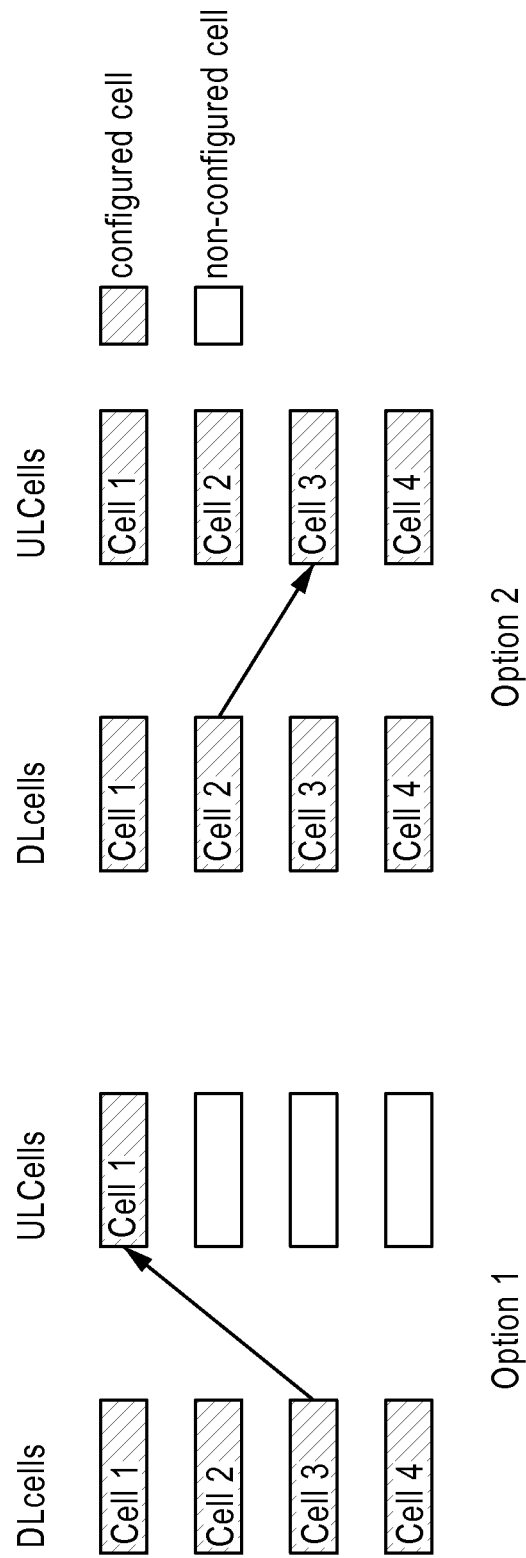
FIG. 7 illustrates a diagram depicting an example of the principle behind implicit association rules related to an embodiment.

FIG. 7 is a diagram illustrating an example of the principle behind implicit association rules related to an embodiment. Cross-carrier scheduling, i.e., UL grant/DL assignment transmission on a different carrier than the corresponding PUSCH, is assumed in both options. In both option 1 and option 2 illustrated in FIG. 7, the DL CC corresponding to the Aperiodic CSI report of a first mode (i.e., the determined DL CC) corresponds to Cell 3. In the example of FIG. 7, in the case of Option 1 for implicit triggering, the serving cell that carries the UL grant or the DL assignment includes the A-CSI trigger. This is a good approach for the scenarios with a large number of configured CCs in the DL side and with limited CA capability in UL side, i.e. DL-UL asymmetry. In the case of option 2 for implicit triggering, according to the example of FIG. 7, the serving cell that carries the PUSCH or the PDSCH includes the A-CSI report. This is a good approach for the case when the number of CCs in the UL side is similar to that of DL. It should be noted that given associations give the same results with self-scheduling, whereas in the case of cross-carrier scheduling the outcome may differ from each other.

According to some embodiments, it is also possible to define a hybrid solution based on the two options. This could be used, for example, in the case when two groups of cells have been configured, and where cross-carrier scheduling operates within the group (but not between groups).

Figure 8A:
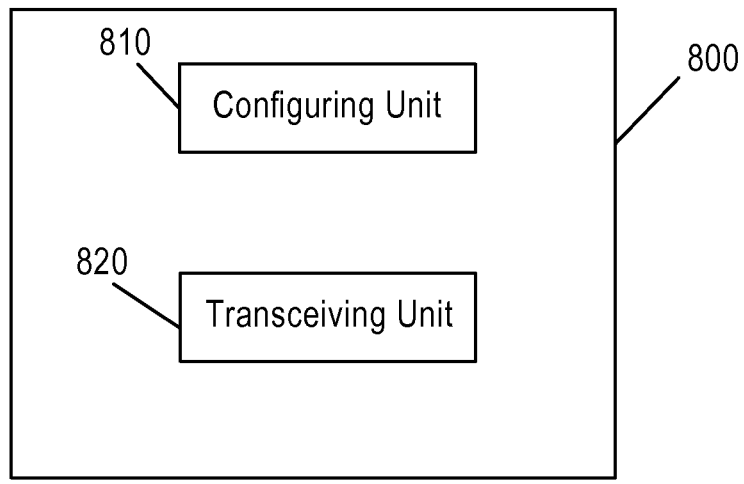
FIG. 8a illustrates a block diagram of an apparatus, according to an embodiment of the invention.

FIG. 8a illustrates a block diagram of an apparatus 800 according to an embodiment of the invention. In this embodiment, apparatus 800 may be a network node, such as a base or access station, node B, or eNB. As illustrated in FIG. 8a, apparatus 800 may include a configuring unit or means 810 and a transceiving unit or means 820. In an embodiment, configuring unit or means 810 may configure (and transmit the configuration of) two A-CSI reporting modes per one or more configured DL CC via, for example, RRC signaling. In an embodiment, transceiving unit or means 820 may transmit an A-CSI trigger to one or more UEs. According to certain embodiments, the transmitted A-CSI trigger may cause the UE(s) to dynamically switch between the two A-CSI reporting modes. For example, in one embodiment, the A-CSI trigger may cause the UE(s) to apply a first of the two A-CSI reporting modes when the A-CSI trigger is associated implicitly with that DL component carrier. According to one embodiment, the first A-CSI reporting mode may have a large format. According to an embodiment, the A-CSI trigger may cause the UE(s) to apply a second of the two A-CSI reporting modes when the A-CSI trigger refers to some other DL configured component carrier. In one embodiment, the second A-CSI reporting mode may have a compact format. According to an embodiment, transceiving unit or means 820 may further receive the A-CSI report according to the triggered/requested A-CSI.

Figure 8B:
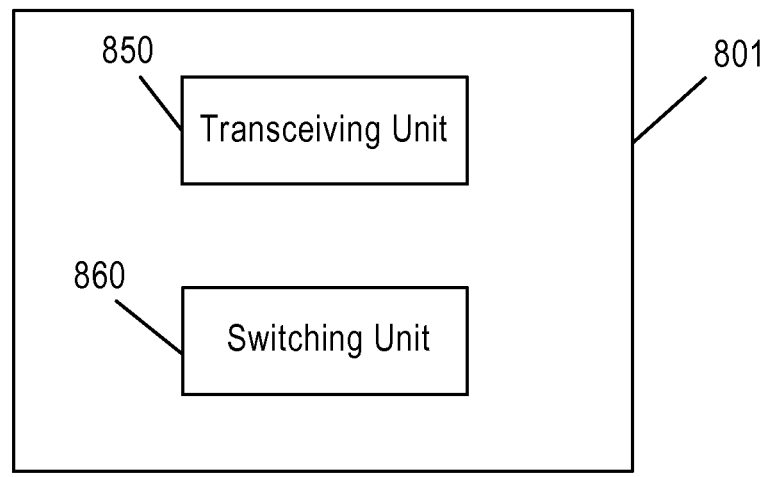
FIG. 8b illustrates a block diagram of an apparatus, according to another embodiment.

FIG. 8b illustrates a block diagram of an apparatus 801 according to an embodiment of the invention. In this embodiment, apparatus 801 may be a mobile device, such as a UE. As illustrated in FIG. 8b, apparatus 801 may include a transceiving unit or means 850 and a switching unit or means 860. According to an embodiment, transceiving unit or means 850 may receive a configuration of two A-CSI reporting modes per component carrier, and receive an A-CSI trigger from a network node (e.g., eNB). In an embodiment, the A-CSI trigger (e.g., CSI request field) may include an indication of how the two A-CSI reporting modes should be applied. According to one embodiment, switching unit or means 860 may dynamically switch between the two A-CSI reporting modes based on the indication in the A-CSI trigger in order to produce an appropriate A-CSI report. In other words, based on the received A-CSI trigger, switching unit or means 860 determines which A-CSI mode (i.e., first or second mode) to report for each component carrier. Transceiving unit or means 850 may then transmit the A-CSI report to the network node.

Figure 9A:
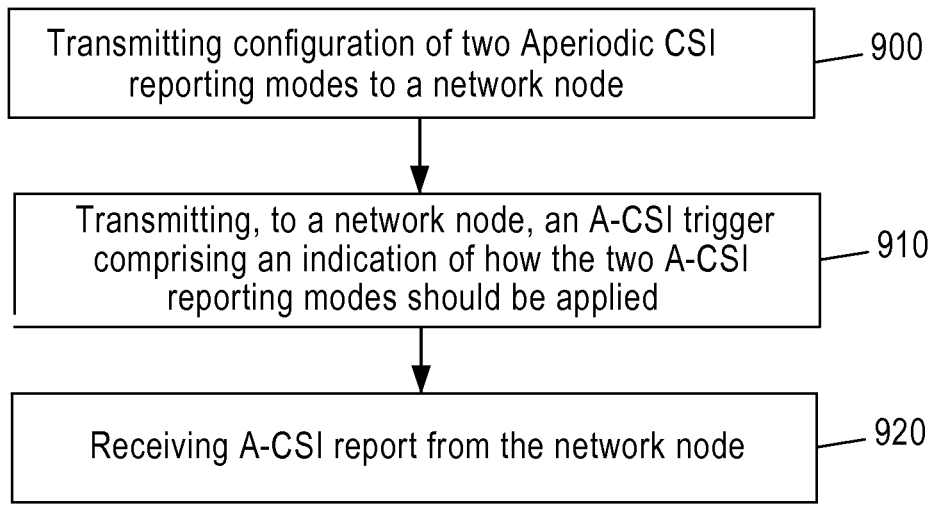
FIG. 9a illustrates an example flow diagram of a method, according to one embodiment.

FIG. 9a illustrates an example flow diagram of a method according to one embodiment. In an embodiment, the method of FIG. 9a may be executed by a network node or access node, such as a base station or eNB. As illustrated in FIG. 9a, the method may include, at 900, transmitting configuration of two A-CSI reporting modes per one or more configured DL CC via, for example, RRC signaling to one or more UEs. In an embodiment, the method may also include, at 910, transmitting an A-CSI trigger (e.g., CSI request field) to one or more UEs. The A-CSI trigger may include an indication of how the two A-CSI reporting modes should be applied. According to certain embodiments, the transmitting of the A-CSI trigger may cause the UE(s) to dynamically switch between the two A-CSI reporting modes.

For example, in one embodiment, the transmitting of the A-CSI trigger may cause the UE(s) to apply a first of the two A-CSI reporting modes when the A-CSI trigger is associated implicitly with that DL component carrier. According to one embodiment, the first A-CSI reporting mode may have a large format. In certain embodiments, implicit association can be determined based on, for example, two options. Under option 1, implicit association may be determined based on the serving cell which carries (e.g., via PDCCH or EPDCCH) the UL grant or the DL assignment including the A-CSI trigger. Under option 2, implicit association may be determined based on the serving cell which shall carry the PUSCH including the A-CSI report.

According to an embodiment, transmitting of the A-CSI trigger may cause the UE(s) to apply a second of the two A-CSI reporting modes when the A-CSI trigger refers to some other DL component carrier. In one embodiment, the second A-CSI reporting mode may have a compact format. In one embodiment, the method may also include, at 920, receiving an A-CSI report from a network node (e.g., the UE(s)) according to the triggered/requested A-CSI.

Figure 9B:
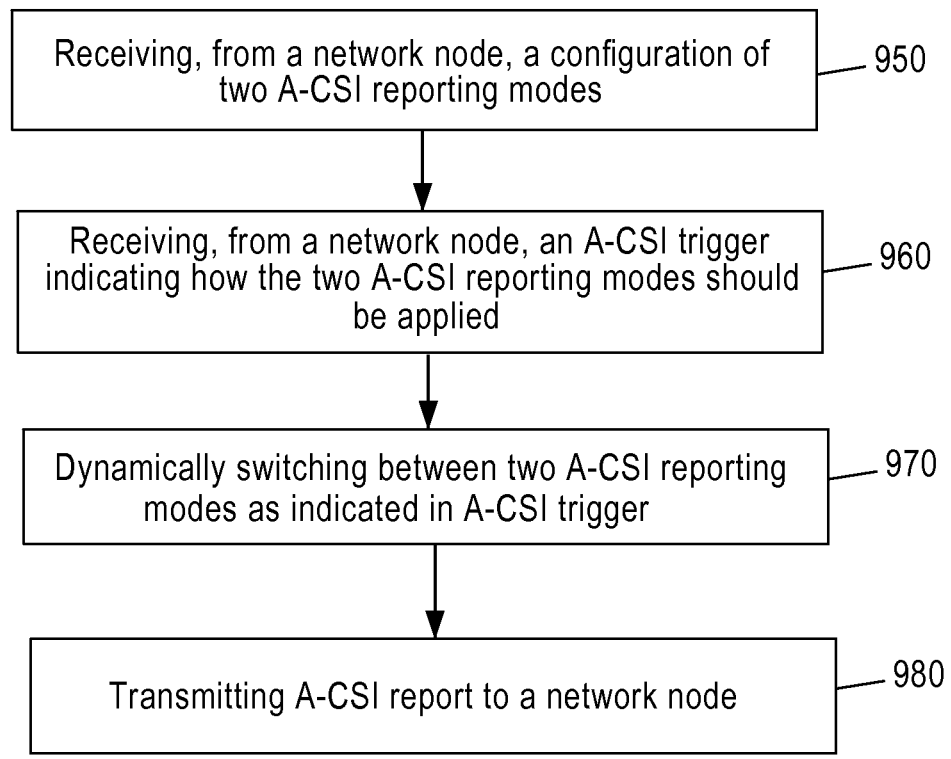
FIG. 9b illustrates an example flow diagram of a method, according to another embodiment.

FIG. 9b illustrates an example flow diagram of a method according to another embodiment. In an embodiment, the method of FIG. 9b may be executed by a mobile device, such as a UE. As illustrated in FIG. 9b, the method may include, at 950, receiving a configuration of two A-CSI reporting modes per one or more configured DL CC via r and, at 960, receiving an A-CSI trigger from a network node (e.g., eNB) to indicate how the two configured A-CSI reporting modes should be applied. In an embodiment, the A-CSI trigger may be a CSI request field that indicates how the two configured A-CSI reporting modes, which may correspond to one or more configured DL component carrier, should be applied for each carrier. According to one embodiment, the method may further include, at 970, dynamically switching between the two configured A-CSI reporting modes based on the A-CSI trigger to produce an appropriate A-CSI report for each carrier. The method may also include, at 980, transmitting the A-CSI report to the network node.

In some embodiments, the functionality of any of the methods described herein, such as those illustrated in FIGS. 9a and 9b discussed above, may be implemented by software and/or computer program code or portions of it stored in memory or other computer readable or tangible media, and executed by a processor. In some embodiments, the apparatuses described herein may be, included or be associated with at least one software application, module, unit or entity configured as arithmetic operation(s), or as a program or portions of it (including an added or updated software routine), executed by at least one operation processor.

Programs, also called program products or computer programs, including software routines, applets and macros, may be stored in any apparatus-readable data storage medium and they include program instructions to perform particular tasks. A computer program product may comprise one or more computer-executable components which, when the program is run, are configured to carry out embodiments. The one or more computer-executable components may be at least one software code or portions of it. Modifications and configurations required for implementing functionality of an embodiment may be performed as routine(s), which may be implemented as added or updated software routine(s). Software routine(s) may be downloaded into the apparatus.

Software or a computer program code or portions of it may be in a source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other embodiments, the functionality of any method or apparatus described herein may be performed by hardware, for example through the use of an application specific integrated circuit (ASIC), a programmable gate array (PGA), a field programmable gate array (FPGA), or any other combination of hardware and software. In yet another embodiment, the functionality may be implemented as a signal, a non-tangible means that can be carried by an electromagnetic signal downloaded from the Internet or other network.

According to an embodiment, an apparatus, such as a node, device, or a corresponding component, may be configured as a computer or a microprocessor, such as single-chip computer element, or as a chipset, including at least a memory for providing storage capacity used for arithmetic operation and an operation processor for executing the arithmetic operation.

In view of the above, certain embodiments of the invention may provide several advantages. For example, some advantages may include increasing the flexibility of Aperiodic CSI feedback to cope with an increased number of DL carriers and new scenarios (such as LAA). In addition, the CSI reporting overhead can be kept at a reasonable level to preserve UL link budget (or coverage), and similarly the triggering overhead is kept low (e.g., in some embodiments, no DCI enhancements are needed). Further, the specification and implementation changes that may be required are minor.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. An apparatus, comprising:
   at least one processor; and
   at least one memory including computer program code,
   wherein the at least one memory and computer program code are configured, with the at least one processor, to cause the apparatus at least to:

transmit a configuration of at least two aperiodic channel state information reporting modes per each of more than one configured downlink component carrier to at least one user equipment, wherein each of the at least two aperiodic channel state information reporting modes is configured independently for each downlink component carrier of the more than one configured downlink component carrier; and transmit an aperiodic channel state information trigger to the at least one user equipment, wherein the aperiodic channel state information trigger causes the at least two aperiodic channel state information reporting modes should be applied by the at least one user equipment when the aperiodic channel state information trigger is implicitly associated with at least one determined downlink component carrier, wherein an implicit association is determined based on which serving cell will carry a physical uplink shared channel state information report including an aperiodic channel state information report for at least one of the at least two aperiodic channel state information reporting modes, and wherein based on the indication the aperiodic channel state information trigger causes the at least one user equipment to dynamically switch to one of at least two configured aperiodic channel state information reporting modes, wherein a second aperiodic channel state information reporting mode of the at least two aperiodic channel state information reporting modes has a compact format of a first number of bits per component carrier, and wherein a first aperiodic channel state information reporting mode of the at least two aperiodic channel state information reporting modes has a large format up to a second number of bits, wherein the first number of bits is less than the second number of bits.

2. The apparatus according to claim 1, wherein based on the aperiodic channel state information trigger having the implicit association with the at least one determined downlink component carrier, a large format is applied to the at least one determined downlink component carrier prior to transmitting the aperiodic channel state information trigger, and wherein based on the aperiodic channel state information trigger only referring to at least one other downlink component carrier, a compact format is applied for the at least one other downlink component carrier prior to transmitting the aperiodic channel state information trigger.

3. The apparatus according to claim 1, wherein the transmitting of the aperiodic channel state information trigger causes the at least one user equipment to switch between the first aperiodic channel state information reporting mode and the second aperiodic channel state information reporting mode of the at least two aperiodic channel state information reporting modes based on the aperiodic channel state information trigger referring to at least one other downlink component carrier.

4. The apparatus according to claim 1, wherein the at least one memory and computer program code are further configured to, with the at least one processor, cause the apparatus at least to receive an aperiodic channel state information report from the at least one user equipment based on the triggered aperiodic channel state information.

5. The apparatus according to claim 1, wherein the apparatus comprises an evolved node B.

6. The apparatus according to claim 1, wherein the indication is included in a channel state information request field of the aperiodic channel state information trigger.

7. The apparatus according to claim 1, wherein the the compact format of the first number of bits is using 4 to 11 bits per component carrier.

8. The apparatus according to claim 1, wherein the large format of up to the second number of bits is using 112 bits.

9. An apparatus comprising:
at least one processor; and
at least one memory including computer program code, wherein the at least one memory and computer program code are configured, with the at least one processor, to cause the apparatus at least to receive, by a user equipment, a configuration of at least two aperiodic channel state information reporting modes per component carrier of more than one configured component carrier, wherein each of the at least two aperiodic channel state information reporting modes is configured independently for each component carrier of the more than one configured component carrier;

receive, by the user equipment, an aperiodic channel state information trigger from a network node, wherein the aperiodic channel state information trigger causes the at least two aperiodic channel state information reporting modes should be applied by the user equipment when the aperiodic channel state information trigger is implicitly associated with at least one determined downlink component carrier wherein an implicit association is determined based on which serving cell will carry a physical uplink shared channel state information report including an aperiodic channel state information report for at least one of the at least two aperiodic channel state information reporting modes; and based on the indication the aperiodic channel state information trigger, dynamically switch by the user equipment to one of at least two configured aperiodic channel state information reporting modes, wherein a second aperiodic channel state information reporting mode of the at least two aperiodic channel state information reporting modes has a compact format of a first number of bits per component carrier, and wherein a first aperiodic channel state information reporting mode of the at least two aperiodic channel state information reporting modes has a large format up to a second number of bits, wherein the first number of bits is less than the second number of bits.

10. The apparatus according to claim 9, wherein based on the aperiodic channel state information trigger having the implicit association with the at least one determined downlink component carrier, a large format is applied to the at least one determined downlink component carrier prior to transmitting the aperiodic channel state information trigger, and wherein based on the aperiodic channel state information trigger only referring to the at least one other downlink component carrier, a compact format is applied for the at least one other downlink component carrier.

11. The apparatus according to claim 9, wherein the at least one memory and computer program code are further configured to, with the at least one processor, cause the apparatus at least to transmit the aperiodic channel state information report to the network node.

12. The apparatus according to claim 9, wherein the at least one memory and computer program code are further configured to, with the at least one processor, cause the apparatus at least to switch to the first aperiodic channel state information reporting mode of the at least two aperiodic channel state information reporting modes when the aperiodic channel state information trigger is associated implicitly with at least one determined downlink component carrier.

13. The apparatus according to claim 9, wherein the at least one memory and computer program code are further configured to, with the at least one processor, cause the apparatus at least to:
   switch to the second aperiodic channel state information reporting mode of the at least two aperiodic channel state information reporting modes based on the aperiodic channel state information trigger referring to at least one other downlink component carrier.

14. A method, comprising:
   receiving, by a user equipment, configuration of at least two aperiodic channel state information reporting modes per each of more than one configured downlink component carriers, wherein each of the at least two aperiodic channel state information reporting modes is configured independently for each component carrier of the more than one configured component carrier;
   receiving an aperiodic channel state information trigger from a network node, wherein the aperiodic channel state information trigger causes the at least two aperiodic channel state information reporting modes should be applied by the user equipment when the aperiodic channel state information trigger is implicitly associated with at least one determined downlink component carrier, wherein an implicit association is determined based on which serving cell will carry a physical uplink shared channel state information report including an aperiodic channel state information report for at least one of the at least two aperiodic channel state information reporting modes; and
   based on the indication the aperiodic channel state information trigger, dynamically switch by the user equipment to one of at least two configured aperiodic channel state information reporting modes,
   wherein a second aperiodic channel state information reporting mode of the at least two aperiodic channel state information reporting modes has a compact format of a first number of bits per component carrier, and
   wherein a first aperiodic channel state information reporting mode of the at least two aperiodic channel state information reporting modes has a large format up to a second number of bits, wherein the first number of bits is less than the second number of bits.

15. The method according to claim 14, wherein based on the aperiodic channel state information trigger having the implicit association with the at least one determined downlink component carrier, a large or frequency selective format is applied to the at least one determined downlink component carrier prior to transmitting the aperiodic channel state information trigger, and wherein based on the aperiodic channel state information trigger only referring to the at least one other downlink component carrier, a compact format is applied for the at least one other downlink component carrier.

16. The method according to claim 14, further comprising transmitting the aperiodic channel state information report to the network node.

17. The method according to claim 14, further comprising switching to the first aperiodic channel state information reporting mode of the at least two aperiodic channel state information reporting modes based on the aperiodic channel state information trigger being associated implicitly with at least one determined downlink component carrier.

18. The method according to claim 14, further comprising switching to the second aperiodic channel state information reporting mode of the at least two aperiodic channel state information reporting modes based on the aperiodic channel state information trigger referring to at least one other downlink component carrier.

* * * * *